US005943064A

United States Patent [19]
Hong

[11] Patent Number: 5,943,064
[45] Date of Patent: Aug. 24, 1999

[54] APPARATUS FOR PROCESSING MULTIPLE TYPES OF GRAPHICS DATA FOR DISPLAY

[75] Inventor: Xin Cheng (Simon) Hong, San Jose, Calif.

[73] Assignee: Trident Microsystems, Inc., Mountain View, Calif.

[21] Appl. No.: 08/972,461

[22] Filed: Nov. 15, 1997

[51] Int. Cl.[6] .......... G06F 15/16

[52] U.S. Cl. .......... 345/502; 345/132; 345/507

[58] Field of Search .......... 345/132, 501, 345/502, 507, 509, 512, 153, 154, 439

[56] References Cited

U.S. PATENT DOCUMENTS

| | | | |
|---|---|---|---|
| 5,517,612 | 5/1996 | Dwin et al. | 345/507 |
| 5,808,630 | 9/1998 | Pannell | 345/509 |

*Primary Examiner*—Kee M. Tung
*Attorney, Agent, or Firm*—Gray, Cary, Ware & Freidenrich

[57] ABSTRACT

A controller card is provided that allows the processing and display of two types of graphics pixel data for display in two environments. The card contains a first graphics controller chip coupled to the video capture port of a second graphics controller chip. In a first mode the first chip may generate graphics pixel data for display in a first environment. The pixel data is stored in the memory of the second chip reserved for graphics pixel data and transmitted to a display device coupled to the second chip. In a second mode, the video capture port may be coupled to a video source so that data captured in the video port is stored in the memory of the chip reserved for video pixel data. The second chip may then process and output to the display device both video pixel data and a second type of graphics pixel data generated by the second chip and stored in the memory of the second chip reserved for graphics pixel data.

12 Claims, 4 Drawing Sheets

APPARATUS FOR PROCESSING MULTIPLE TYPES OF GRAPHICS DATA FOR DISPLAY

BACKGROUND OF THE INVENTION

This invention relates generally to an apparatus and method for processing graphics data, and more particularly to an apparatus and method for processing multiple types of graphics pixel data for display in different environments.

Today, in order to run the many multimedia products on the market, computer systems are required to display many different types of images. A computer system may run different programs that generate different types of images at different times. For example, an application program may display graphs and charts generated by accounting programs and used to track a business' profits and losses. Later, the same computer system may run a second application program that displays other graphics data, such as Japanese kanji characters to provide instructions to a Japanese user, or the system may run a third application program that generates and displays English alphanumeric characters. In all cases, the computer system may run multiple programs that generate images unique to particular applications (i.e., generated for different environments) and users, and the computer system must be able to display these different types of images.

Conventional computer systems may use a graphics system to generate graphics and video pixel data for display on a display device. It is this pixel data that is passed to the display device and that produces the image viewed on the display device. While most computer systems can generate low-level graphics images, specialized graphics systems are used because they can process and generate a wider variety of graphics images, and can do so more quickly and efficiently.

A graphics system typically contains a graphics controller card (also called a graphics accelerator or graphics adapter card) having a graphics controller chip that can process both graphics data and video data to produce graphics and video pixel data. The graphics controller chip generally contains a graphics processing engine that processes graphics data to produce graphics pixel data, and a graphics display engine that routes graphics pixel data to a display device. Some graphics controller chips may also have a video display engine that processes and routes video pixel data to the display device. Graphics and video data must be processed differently because each type of data is formatted differently. For example, graphics data is generally in RGB format and may include a graphics data block that contains commands and data points. A command may correspond to the line-drawing function, and the data points may correspond to the endpoints of the line. The graphics processing engine may include algorithms to process this graphics data block to efficiently determine the internal points of the line and may generate pixel data corresponding to those points so that pixel data representing the complete line can be transmitted to a display device for display. The graphics display engine then transmits this pixel data to the display device.

In contrast, video data is generally in YUV format and does not include commands, but only video pixel data. The video display engine may be invoked to perform functions related to video pixel data, such as filtering the video pixel data or scaling it so that the resulting video image can fit the dimensions of the display device. In a conventional graphics system, a graphics chip can be used to process graphics data in one format for display in one environment, and video data in another format for display in another one environment; however, because the processing of each type of data may require a long sequence of instructions stored in a limited memory on the graphics controller chip, generally only one type of graphics data may be processed by each graphics controller chip to produce graphics pixel data.

More powerful computer systems may display multiple types of graphics images in different formats. For example, a system may display special graphics images for one application when the system is first turned on, and, later, different types of graphical images for different application programs invoked by the computer system. One type of graphics images may, for example, be Japanese kanji characters that may be used to lead a Japanese user through a sequence of steps when his computer is first turned on. Later, during another mode of operation, the system may display graphics images for another application, such as one in which English language text is displayed. Because these two types (i.e., sets) of graphics images may be processed differently, two graphics engines and thus two graphics controller chips may be required to process the multiple types of graphics images. For example, the first application program may generate a sequence of bits corresponding to a Japanese kanji character with its unique graphics pixel data, and the second application program may generate the same sequence of bits, but corresponding to an English alphabetic character. Thus, in different applications, the same data must be processed differently to generate unique pixel data corresponding to the image to be displayed. Because each graphics controller chip can generally process graphics data corresponding to only one format, if multiple types of graphics data are to be processed, each type must be processed by a different graphics controller chip.

When multiple graphics controller chips are used to generate graphics pixel data in various formats for various applications, the graphics controller card may use switching circuitry to switch between the outputs of the graphics controller chips to route the appropriate graphics pixel data to the display device. One conventional display apparatus uses a multiplexer to select either the output of a first graphics controller chip that processes a first type of graphics data to produce a first type of graphics pixel data, or the output of a second graphics controller chip that processes a second type of graphics data to produce a second type of graphics pixel data. In this conventional apparatus, the first graphics controller chip feeds its output to one input of the multiplexer, whose output is connected to the display device. The output of the second graphics controller chip may be fed to a display controller chip, such as an LCD controller chip, whose output may in turn be fed to a second input of the multiplexer. A display controller chip may be needed to translate pixel data to a format acceptable to the display device. This may be necessary, for example, if the first graphics controller chip cannot process internal graphics data for a particular display device, but the second graphics controller chip can. If additional graphics controller chips are used, additional display controller chips may be required. Multiplexer control signals may be used to select which output is routed to the display device.

This conventional graphics controller card for displaying multiple types of graphics pixel data is expensive, bulky, and consumes a lot of power. The additional multiplexers and display controller chips must each be placed on the limited surface area of the graphics controller card, each generating heat and adding to the delay of data processed by the graphics controller card. The outputs of the graphics controller chips must be connected to the input pins of the multiplexer, and data storage and retrieval systems used to route data within the graphics controller card must now interface with the control circuitry of the multiplexer. If additional graphics controller chips are required, larger multiplexers and additional display controller chips may be required. All of these modifications to off-the-shelf graphics controller cards require custom-made graphics controller cards, rather than less expensive, easily-adaptable, off-the-shelf graphics controller cards. Accordingly, there exists a need for an apparatus and method for processing multiple graphics data which avoids these and other problems of known apparatus and methods. It is to this end that the present invention is directed.

SUMMARY OF THE INVENTION

The invention provides a data processing apparatus that solves the foregoing and other problems of known graphics data processing apparatus. The data processing apparatus of the invention processes multiple types of graphics data for display in multiple different environments using a minimum number of components, and it consumes less power than conventional systems. The invention achieves this result by providing graphics controller apparatus containing at least two graphics controller chips and control circuitry for controlling the graphics controller chips. The first graphics controller chip processes the first type of graphics data and is connected to a video capture input port on the second graphics controller chip which is normally reserved for video data. The second graphics controller chip controls display of the first type of graphics data, thereby obviating the need for switching circuitry like multiplexers and other types of controllers which characterize the prior art.

The invention operates in a first mode using a graphics engine of the first graphics controller chip to generate a first type of graphics pixel data for one application. In this mode, the second graphics controller chip captures the first type of digital graphics pixel data in its video capture input port, stores it directly in a portion of memory reserved for graphics data, and, using a graphics display engine, transmits it to a display device for display. The second graphics controller chip performs no processing operations on the first graphics pixel data. Graphics images that are formatted for display in a first environment can thus be transmitted using a graphics display engine on the first graphics controller chip for later display.

After the first type of graphics data has been processed for display in the first environment and stored in the frame buffer in the second chip, the second graphics controller chip may be switched by the control circuitry to operate in a second mode to display graphics images formatted for display in a second environment. In this second mode the second graphics controller chip uses its own graphics processing engine to process graphics data that it receives and generates a second type of graphics pixel data for display in the second environment. Again using the graphics display engine on the second chip, the graphics pixel data is transmitted to the display device. In this second mode, video pixel data can now be captured in the capture port and processed for display using a video display engine on the second chip.

Thus, in accordance with the invention, using a minimum number of components, a graphics controller card can, in a first mode, advantageously process a first type of graphics data for display in one environment, and, in a second mode, process video data and a second type of graphics data for display in another environment.

DETAILED DESCRIPTION OF A PREFERRED EMBODIMENT

The invention is particularly applicable to an apparatus and method for processing and displaying multiple types of graphics data for display in different environments, and it is in this context that the invention will be described. It will be appreciated, however, that the invention has greater utility.

Figure 1:
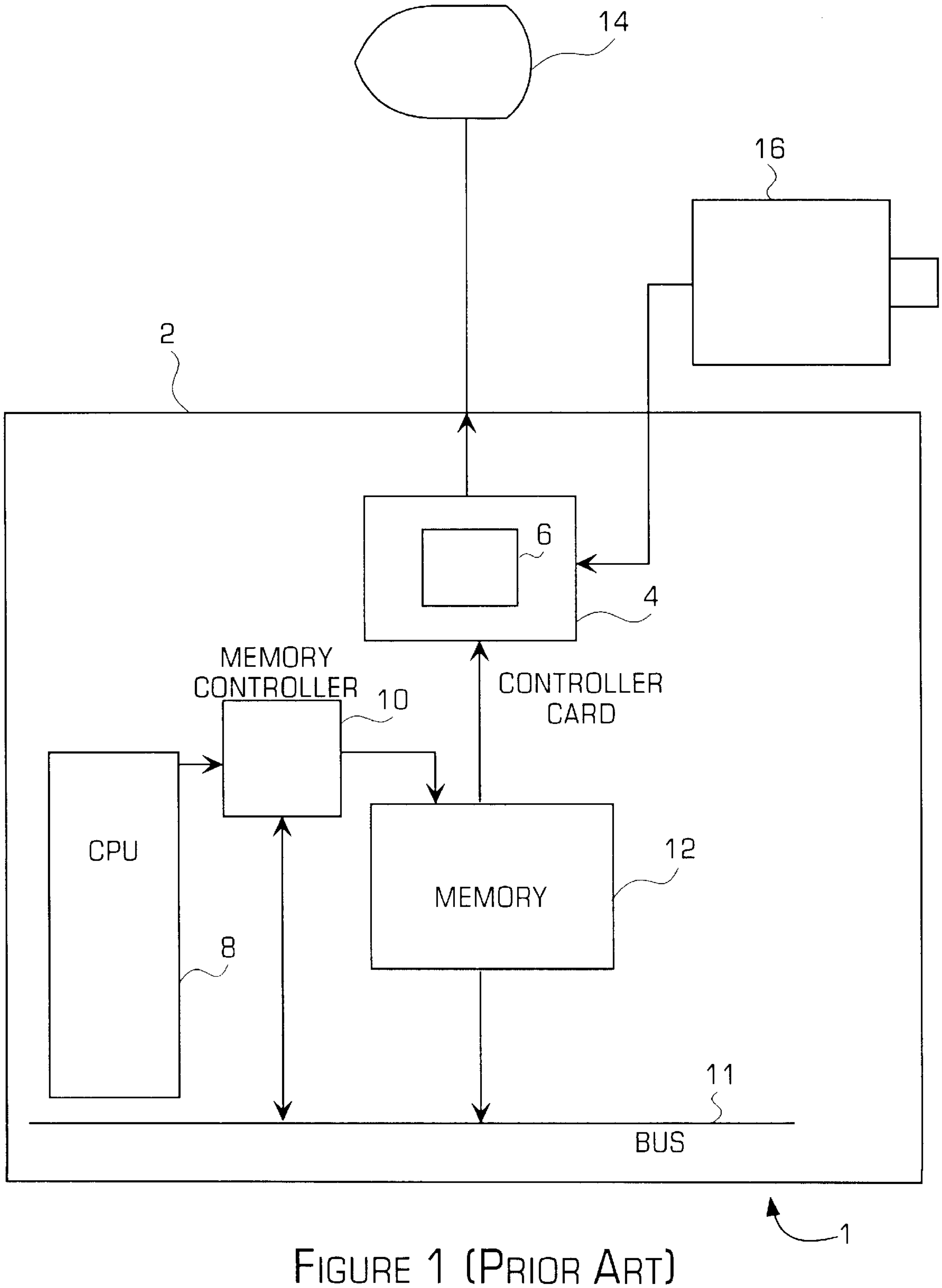
FIGURE 1 (PRIOR ART)
FIG. 1 is a block diagram of a conventional apparatus for displaying graphics and video data.

FIG. 1 illustrates a conventional computer system 1 that may be used to process and display graphics and video images. The computer system may have a circuit board 2 containing data processing circuitry, as discussed below, a video source 16 that produces video data, and an output for a display device 14 for displaying text and image data processed by the computer system. The data processing circuitry generally contains a CPU 8 for, among other things, running application programs stored in a memory 12, which may additionally store data generated by the applications programs. A memory controller 10 controls accesses to and from the memory; a graphics controller card 4 receives graphics data from the memory and the video source, and processes the data for display on the display device; and a data bus 11 routes data between components on the circuit board. The controller card may have its own internal frame buffer 6 for storing graphics and video data before processing it for display on the display device. When an application program running in the system memory wishes to use the graphics controller card to generate graphics pixel data for display, it transmits a graphics data block from the memory to the controller card. As discussed below, the controller card may then process the graphics data to produce graphics pixel data, which may then be stored in the internal frame buffer of the controller card. From the frame buffer the graphics pixel data may be retrieved by a graphics display engine (not shown) and transmitted to the display device.

Figure 2:
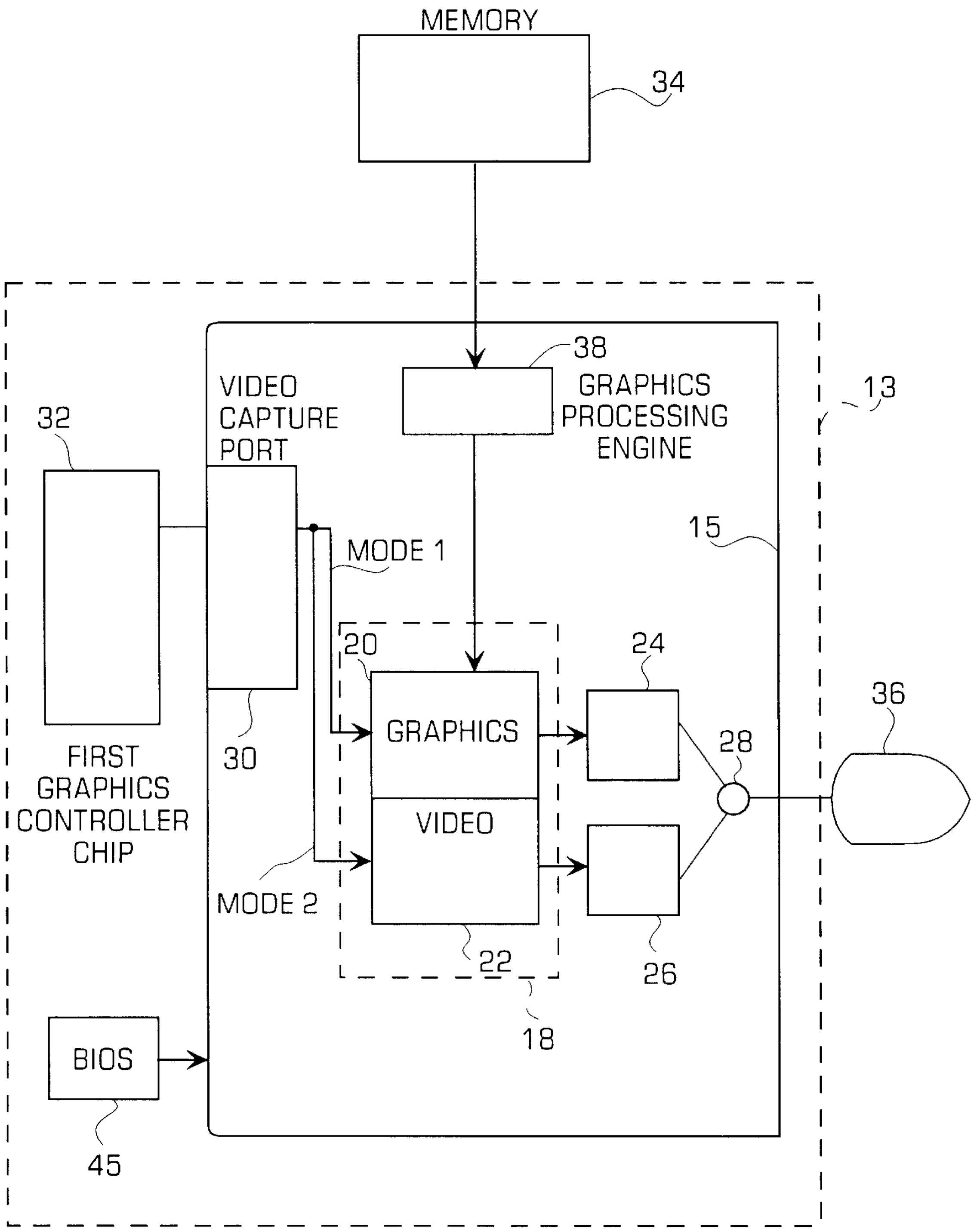
FIG. 2 is a block diagram of an apparatus for displaying two types of graphics data in accordance with the invention.

FIG. 2 is a diagram of an apparatus in accordance with the present invention comprising graphics controller apparatus, such as a card 13, having two graphics controller chips for processing two different types of graphics data to produce two different types of graphics pixel data. As shown in FIG. 2, a first graphics controller chip 32 may be coupled to a second graphics controller chip 15 (shown enlarged with several of its functional components) so that in a first mode graphics pixel data generated by the first graphics controller chip 32 can be transmitted to the second graphics controller chip 15 for storage and transmission to a display device 36. This structure advantageously allows the first graphics controller used to process the first type of graphics data to be an inexpensive, commonly available graphics or video controller chip which may not contain complex circuitry for interfacing with the display device. This first chip may use the processing and interface circuitry on the second graphics controller chip so that graphics pixel data generated by the first graphics controller chip can be transmitted by the second graphics controller chip to the display device for display. In a second mode, normal video pixel data may be stored in the video capture port of the second graphics controller chip for processing and later display as usual. In this second mode, the second graphics controller chip may also process graphics data generated on the computer system, and, as discussed below, it may cause the resulting processed graphics pixel data to be displayed on the display device. The input to the video capture port may be coupled to either a video source or a first controller chip by a simple software switch, as discussed below.

As shown in FIG. 2, the first graphics controller chip is connected to a video capture port 30 of the second graphics controller chip. The capture port may normally be connected to a video source that generates video images in the YUV color space. The video capture port has associated scaling and filtering to process the video data for storage and subsequent display. FIG. 2 further shows a system memory 34 for storing graphics data blocks generated, for example, by applications programs running on the computer system. The graphics blocks may be transmitted from the memory to a graphics processing engine 38 on the second graphics controller chip 15. The graphics processing engine may process the graphics data block to produce graphics pixel data that is stored in a frame buffer 18 for processing by the graphics display engine 24 and transmission to the display device 36. The graphics processing engine may include a command queue for storing incoming graphics data blocks that can be processed in either a first-in-first-out (FIFO) or on a priority basis.

In one embodiment, the frame buffer 18 has a graphics buffer segment 20 for storing graphics data and a video buffer segment 22 for storing video data. A video display engine 26 processes the video data stored in the video segment of the frame buffer, and the graphics display engine 24 processes the graphics pixel data stored in the graphics segment of the frame buffer. The video capture port is generally used to receive digital video pixel data for digital processing, storage, and display of video pixel data on a display device, but it may also receive analog video signals, which it may convert to digital video pixel data. The graphics controller card 13 may receive these digital video pixel data from a video source connected to the controller card, and, as discussed below, may route the digital video pixel data to the video segment of frame buffer, where it is later processed by the video display engine and transmitted to a display device 36. The video source may be a television decoder, a video cassette recorder, or any device that generates a signal under the MPEG compression standard. Alternatively, the graphics controller card may process the digital video pixel data before it is stored in the frame buffer. Storing the video data and graphics pixel data in their own dedicated portions of the segmented frame buffer advantageously ensures that each type of data is readily identifiable and is thus easily accessible to both the graphics display engine and the video display engine. This structure allows the engines to know which data it may access and the corresponding operations that each may perform on the data to generate the resulting pixel data later transmitted to the display device.

Data stored in the video segment 22 of the frame buffer 18 may be processed by a video display engine in a manner unique to video data. Thus, for example, data stored in the video segment 22 of the frame buffer may be scaled and filtered to fit the dimensions of the display device. The video pixel data may be converted from one color space, such as the YUV (luminance-chrominance) color space, to a representation in a second color space, such as the RGB (red-green-blue) color space, which may be used to more accurately reproduce the video image on the display device. In addition, when video pixel data is stored in a compressed format to use less memory as, for example, under the MPEG compression standard, the video display engine 26 may decompress the compressed video pixel data before the resulting video pixel data is transmitted to the display device.

Data stored in the graphics segment 20 of the frame buffer is processed differently from data stored in the video segment 22 of the frame buffer. That latter data has already been processed by a graphics processing engine (32). A graphics data block retrieved from memory 34 may contain commands and other data. The commands may include a command to rotate a line, and the data may include the endpoints of the line to be rotated and the angle through which the line is to be rotated. The graphics data may then be processed by the graphics processing engine 24 to produce the pixel data corresponding to all of the points on a line corresponding to the resulting rotated line. Or the command could be one to generate a graph, for example, from a sequence of data points included in the data portion of the graphics data block. The graphics processing engine may then process the data to produce pixel data corresponding to the graph.

Both the video display engine 26 and the graphics display engine 24 may transmit their pixel data to the display device 36 through common switching circuitry 28 on the second graphics controller chip. Graphics and video images could also be combined by, for example, using an overlay and replacing portions of the video pixel data with graphics pixel data. Operation of the graphics controller card during the first and second modes of operation in accordance with the present invention will now be discussed.

During the first mode of operation, graphics pixel data is received at the capture port 30 and stored in the graphics buffer segment 20 of the frame buffer. The graphics display engine 24 then retrieves the graphics pixel data from the frame buffer and transmits it to the display device 36 via switching circuitry 28. In the second mode of operation, a video pixel is received by the capture port 30 and stored in the video buffer segment 22 of the frame buffer. This video pixel data will then be processed by the video display engine 26, which transmits the processed pixel data to the display device. The video display engine may filter the video data to remove noise, background images and may scale the video data so that it fits on and completely fills the screen of the display device. In this second mode, graphics data may be generated by application programs running on the system, processed by the graphics processing engine 38, and stored in the graphics buffer segment 20 of the frame buffer for later processing by the graphics display engine 24 and transmission to the display device.

In accordance with the invention, graphics data can be processed by the first graphics controller chip to produce graphics pixel data that is directly transmitted to the graphics engine on the second graphics controller chip. For example, again using FIG. 2, a first graphics controller chip 32 may receive "special graphics" data that is specially processed by the first graphics controller chip to produce graphics pixel data in a first environment for a first application. The graphics pixel data may be captured by the second graphics controller chip 15 in its video capture port 30 and transferred to the graphics segment 20 of the frame buffer. The graphics pixel data will not be processed as video data, as would data captured in the video capture port during operation in the second mode. The scaling and filtering operations normally applied to video data would not be performed. This special routing and processing of data during the first mode of operation may be controlled by a software controlled control register (discussed more fully below) that directs where data captured in the video capture port is stored, and thus determines how the data will be processed.

Figure 3:
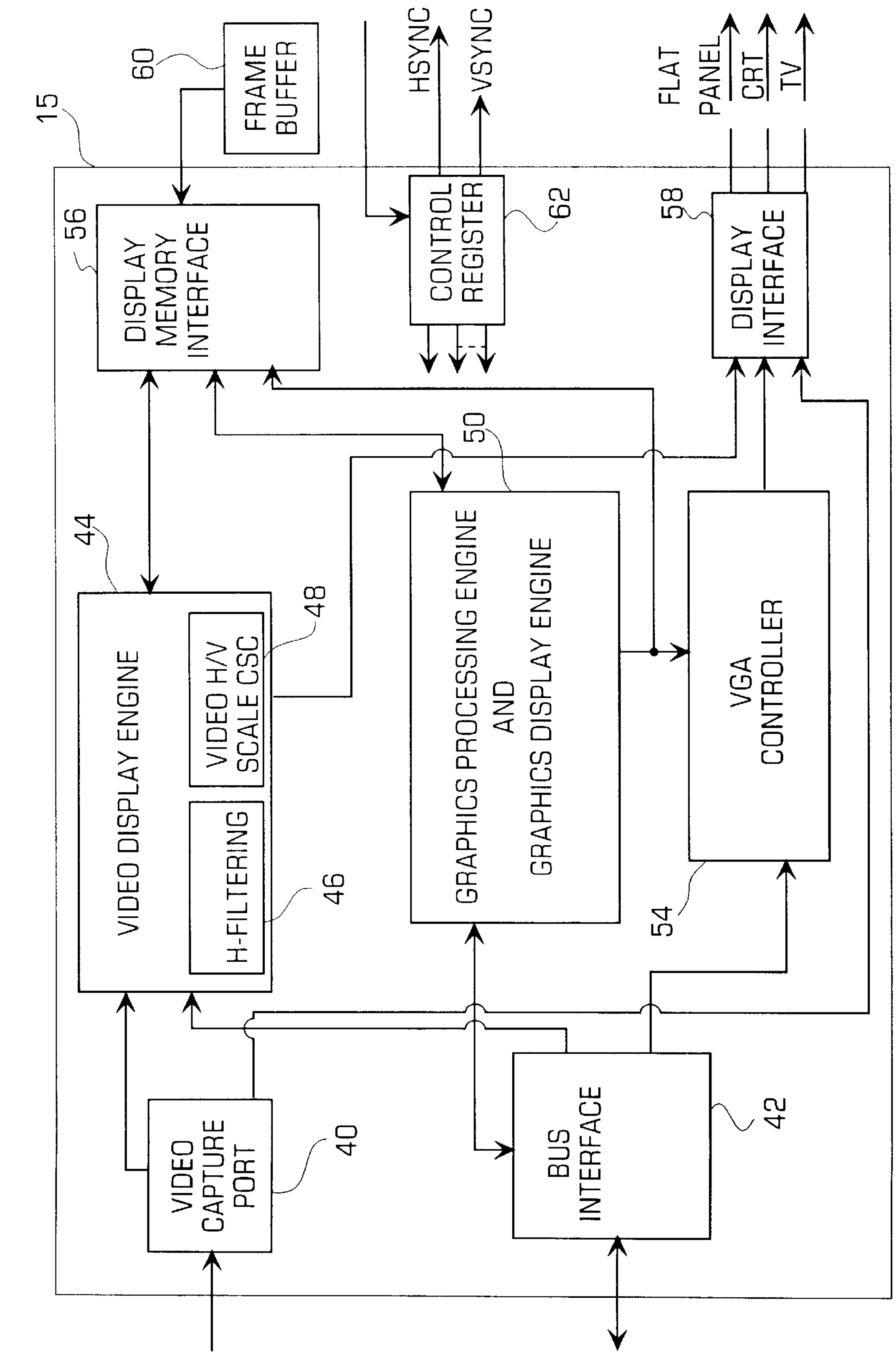
FIG. 3 is a block diagram of one embodiment of a graphics controller chip shown in FIG. 2.

FIG. 3 is a more detailed functional block diagram of a portion of the second graphics controller chip 15 that may be used in accordance with the invention. The controller chip may be, for example, a Cyber 9385 graphics controller chip available from Trident Microsystems, Inc. of Mountain View, Calif. The graphics controller chip may comprise a video capture port 40 for capturing video pixel data from a first graphics controller chip, a video display engine 44 for receiving data from the video capture port and for processing the data either before or after storing it in the frame buffer 60 through the display memory interface 56. The frame buffer may be a distinct memory located on the graphics controller card, or it may be located in the system memory using a unified memory architecture in which the frame buffer is merged into the system main memory. This has the advantage that since an additional memory access is not needed to store data to a frame buffer, the system speed is correspondingly increased. The video display engine 44 may also retrieve the stored video pixel data from the frame buffer and transmit it to the display device through a display interface 58, which may contain circuitry for interfacing the graphics controller chip to a particular display device, such as a flat panel display, a cathode-ray tube, or a television monitor. Alternatively, video pixel data could also be received from an external source (not shown) over a system bus 41. The graphics controller card may also receive graphics pixel data from an application program in system memory (not shown) through a bus interface 42. The data may be routed to a graphics engine 50 (containing the graphics processing engine and the graphics display engine) for processing or to the frame buffer 60 for storage, on to a VGA controller 54 that may format the processed data, and on to the display interface 58 for transmission to the display device.

Data stored in the frame buffer 60 may be transmitted to the display memory interface 56 and, as discussed above, if it is graphics data, processed by the graphics display engine 50, or, if it is video data, processed by the video display engine 44. The graphics controller card also includes a plurality of control registers 62, such as cathode ray tube controller (CRTC) registers. The control registers control the functional elements of FIG. 3 and the routing of data within the second graphics controller chip under software control. For example, loading a control register with an internal memory address may determine that data at one location on the chip will be stored in a predetermined location on the chip. Data could also be transferred by other mapping circuitry that allows data destined for a specific internal location to be mapped to another internal location, such as a segment of the frame buffer. Data loaded into another control register may be used to synchronize the second graphics controller chip with the first graphics controller chip and, for example, generate horizontal (HSYNC) and vertical (VSYNC) synchronization signals used to control the horizontal and vertical displays on the display device, such as a television screen. The control register may be used to control the display device, for example, when a Video Graphics Adapter (VGA) is used. Values in the control register control timing in the display device, such as the timing for the electron gun used to generate images on the display device so that the electron gun is panned across the screen of the display device to produce or refresh a video image. The video display engine, graphics engine, and display interface will now be discussed in more detail.

The video display engine 44 may contain a horizontal filtering (H-filtering) means 46 that filters the video data to remove noise or background information. The video display engine may also comprise a horizontal/vertical scaling and color space conversion (CSC) means 48. The scaling portion of this means may scale the video image up or down in both the horizontal and vertical directions to make it appear either larger, for example, to entirely fill the display device, or smaller, to make it fit on the display device. This downward scaling to reduce the size of the image may save bus bandwidth when transferring the video data to and from memory, and it may conserve memory when storing the video data. The color space conversion operation may be used to translate the video image from one color space, such as the YUV color space, to another color space, such as the RGB color space. A video image may be converted if it is in a color space different from the color space optimally used by the display device. The video display engine may also perform other known functions unique to video data, such as de-interlacing and dithering.

Placing the apparatus in the first mode or the second mode may be accomplished during system initialization, during bootup, when the control registers are written to. In some embodiments, the graphics controller card may support Basic Input Output System (BIOS) interrupt functions for writing to the control registers as shown at 45 in FIG. 2. As discussed above, the control registers may include a video address register for storing the address where data received in the video capture port is stored. Thus, this register may be loaded with the address of the graphics segment of the frame buffer so that any data stored in the video capture port will automatically be stored in the graphics segment of frame buffer, and will be transmitted to the display device by the graphics display engine, as in accordance with the first mode of operation. Additionally, if data in the video capture port is normally filtered and scaled before being stored, the filter and scaling operations will be disabled by loading a control register with an appropriate value. When the second graphics controller card is set to function in the second mode, the control register must be loaded with the address of the video segment of the frame buffer so that data in the video capture port will be stored in the video segment of the frame buffer and processed accordingly. In the second mode, a control register may also be set to activate a switching circuit (not shown) so that data from a video source, and not from the first graphics controller chip, is transmitted to the video capture port.

Figure 4A:
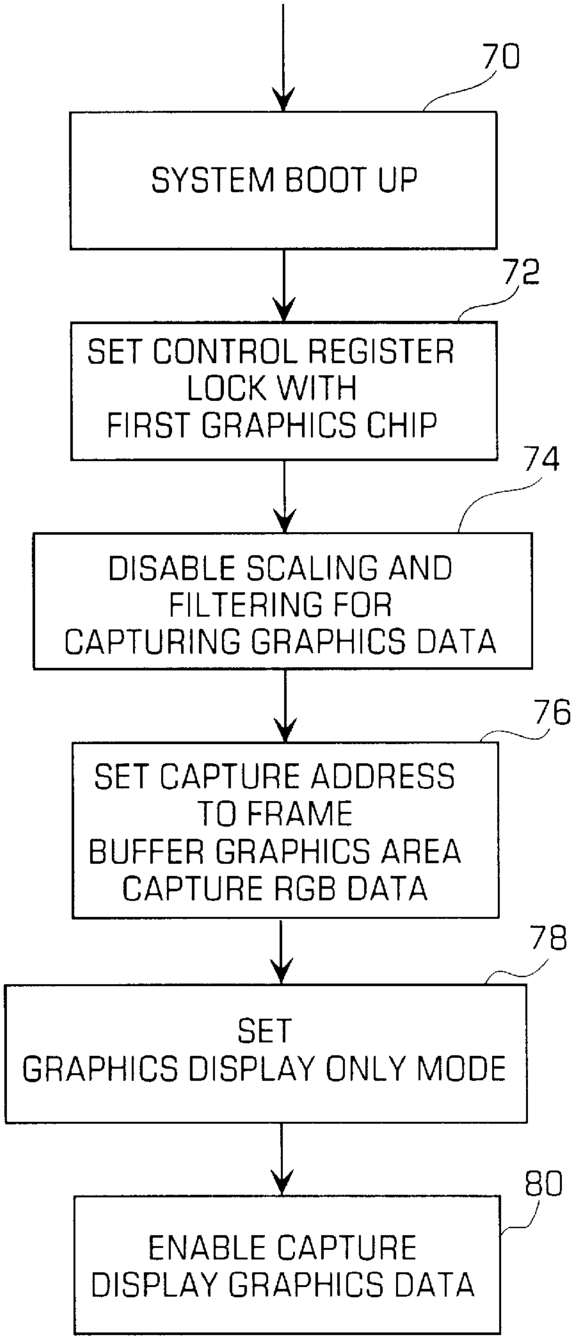
FIGS. 4*a* and *b* show process steps for controlling a graphics controller chip in accordance with one embodiment of the invention.

FIG. 4*a* shows the process steps required to place the graphics controller card in the first mode of operation so that the second graphics controller chip may capture graphics data from a first graphics controller chip for display. In step 70 the system may be booted up using a program stored in ROM (not shown) on the second graphics controller chip. During bootup, values are loaded into the control registers 62 to place the second graphics controller chip in the first mode. Thus, in step 72 a control register, such as a CRTC register, may be synchronized with the first graphics controller chip to ensure the data's integrity, and, for example, by preventing the data from being simultaneously processed by both of the graphics controller chips. Control registers could also be loaded to run the first and second graphics controller chips from the same clock signal. In step 74 scaling and filtering normally performed on video data is disabled. This step is necessary, for example, if data in the capture port is RGB graphics data rather than YUV video data which must be scaled and filtered before being stored in the graphics segment of the segmented frame buffer. If the video data is scaled and filtered after it is stored in the frame buffer, this step may not be necessary, since the data would never be scaled and filtered before it was stored in the frame buffer.

In step 76, a control register may be set to determine the capture address (i.e., the video address register, or the address in memory where the data in the capture port is stored) so that data in the video capture port is transferred to the graphics segment of the frame buffer. In step 78, the graphics display mode is set to "graphics only" mode. This mode determines that only graphics data will be displayed on the display device. Setting this mode obviates the need for the display circuitry to determine what kind of data will be displayed. This speeds up the display generation. Finally, in step 80 a control register is set to activate a switch so that the first graphic controller chip is coupled to the input port of the second graphics controller chip.

Figure 4B:
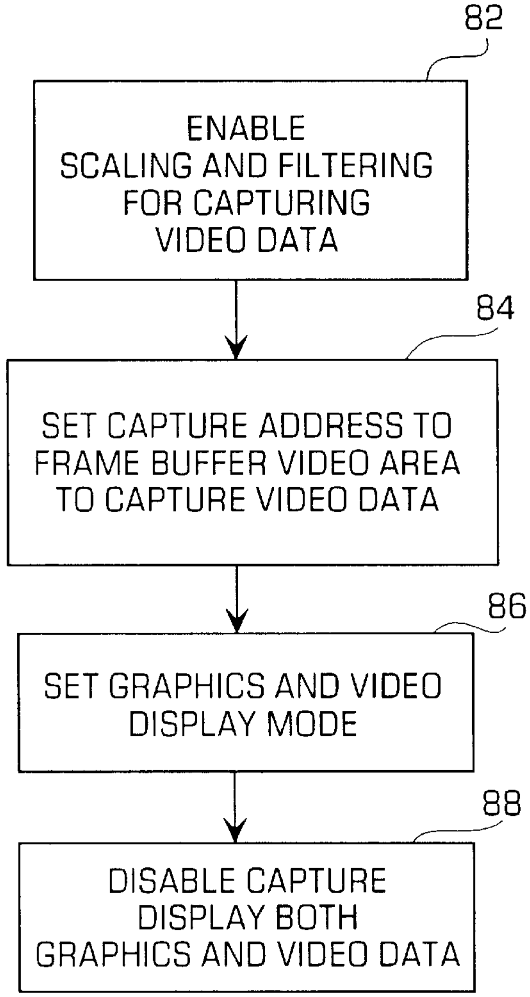

FIG. 4*b* shows the process by which the control register may be loaded with values to place the second graphics controller chip in a second mode so that video data can be captured in the capture port and processed correctly, and also so that the second graphics controller chip can receive a second type of graphics data so that its own graphics processing engine can process the data to produce a second type of graphics pixel data for display. As described above, the control registers are loaded under software control. In step 82 control registers for the video display engine 44 are set to enable scaling and filtering so that video data that will now be received in the input port can be scaled and filtered. This step may not be necessary if the scaling and filtering feature was not turned off in step 74 of FIG. 4*a*. In step 84 the capture address is set so that data in the capture port is stored in the video segment of the frame buffer. In step 86, the graphics controller card is set so that both graphics and video data can be displayed. This may be necessary, for example, when multimedia images comprising both video and graphics data are to be displayed. Finally, in step 88 the input port is coupled to a video source, and both graphics and video data can be processed and transmitted to the display device for display.

As will be appreciated from the foregoing, the invention advantageously processes one type of graphics data for display in a first environment by processing the first type of graphics data with a first graphics controller chip to produce graphics pixel data. The second graphics controller chip then transmits this graphics pixel data generated for a first environment to a display device. Later, the first graphics controller chip is disconnected from the second graphics controller chip, which can now receive data from a video source. The second graphics controller chip can now receive and process for display video data and graphics data from, for example, an application program generated for display in a second environment, as well as graphics data of a second type generated by an application program, for example.

While the foregoing has been with reference to a particular embodiment of the invention, it will be appreciated by those skilled in the art that changes in this embodiment may be made without departing from the principles and spirit of the invention, the scope of which is defined by the appended claims.

I claim:

1. Apparatus for processing graphics data for display on a display device comprising means for receiving first data; means for processing the first data to convert the first data to graphics data of a first type having a predetermined graphics format; a graphics display engine for displaying the graphics data having said predetermined graphics format; video input means for receiving video data; means associated with the video input means for processing the video data to produce video format data; a video display engine for displaying said video format data; means for producing graphics data of a second type having said predetermined graphics format and for supplying said second type of graphics data to said video input means; and control means for disabling processing of the second type of graphics data by said video processing means and said video engine and for routing the second type of graphics data from the video input means to the graphics display engine for display on the display device.

2. The apparatus of claim 1 further comprising a memory having a first segment for storing said graphics format data and having a second segment for storing said video format data; and wherein said control means includes means for routing said second type of graphics data from the video input means to the first segment of the memory.

3. The apparatus of claim 2 wherein said graphics display engine is coupled to said first segment of memory and said video display engine is coupled to said second segment of memory.

4. The apparatus of claim 3 further comprising means for selecting for display data stored in either said first segment of memory or said second segment of memory, and wherein the selection means is controlled by said control means to select for display said second type of graphics data stored in the first segment from the video input means.

5. The apparatus of claim 1, wherein said predetermined graphics format comprises an RGB format, and said video format comprises a YUV format.

6. The apparatus of claim 1, wherein the control means comprises control registers for controlling said video display engine and the routing of data according to control information loaded into the registers by software.

7. The apparatus of claim 2, wherein the video display engine comprises means for filtering and scaling video data, and wherein said control means comprises means for storing video data received at the video input means and processed by the video display engine in the second segment of memory, and for storing graphics data received at the video input in the first segment of the memory.

8. The apparatus of claim 1 further comprising graphics controller means for producing the said first type of graphics data, the graphics controller means being connected to the video input means for receiving said first data.

9. Apparatus for processing first and second graphics data for display on a display device comprising first means for generating first graphics pixel data from the first graphics data; second means for generating second graphics pixel data from the second graphics data, the second generating means comprising a memory for storing in a predetermined segment of such memory both said first type and said second type of graphics pixel data; a video capture port coupled to the first generating means for receiving the first type of graphics pixel data; a second graphics port for receiving the second type of graphics data; a graphics display engine for displaying the first and second types of graphics pixel data; a video display engine coupled to the video capture port for processing for display video data input to the video capture port; and control means for controlling the video display engine and for controlling the routing of data from the video capture port to store the first type of graphics pixel data input to the video capture port directly in said memory without processing by the video display engine.

10. The apparatus of claim 9, wherein said first generating means comprises a first graphics controller semiconductor chip and said second means comprises a second graphics controller semiconductor chip, said second graphics controller semiconductor chip having said video capture port coupled to an output of the first graphics controller semiconductor chip.

11. The apparatus of claim 10, wherein said memory has a first segment for storing video data which is coupled to the video display engine, and has a second segment for storing graphics data coupled to said graphics display engine, and wherein the apparatus further comprises means controlled by said control means for selecting for display data from said video display engine or data from said graphics display engine.

12. The apparatus of claim 11, wherein said control means comprises control registers for controlling the routing of data from the video capture port to the memory and for controlling the selection means to select for display either video data or graphics data.

* * * * *